United States Patent
Krishnamurthi et al.

(10) Patent No.: US 10,203,902 B2
(45) Date of Patent: Feb. 12, 2019

(54) TECHNIQUES FOR DYNAMICALLY ALIGNING A PARTITION WITH A BLOCK SIZE BOUNDARY

(71) Applicant: NetApp Inc., Sunnyvale, CA (US)

(72) Inventors: Baskaran Krishnamurthi, Bangalore (IN); Matthew Mercer, Raleigh, NC (US); Chandramouli Subramanian, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 552 days.

(21) Appl. No.: 14/190,821

(22) Filed: Feb. 26, 2014

(65) Prior Publication Data
US 2015/0169252 A1    Jun. 18, 2015

Related U.S. Application Data

(60) Provisional application No. 61/916,098, filed on Dec. 13, 2013.

(51) Int. Cl.
*G06F 3/06* (2006.01)

(52) U.S. Cl.
CPC ............ *G06F 3/0644* (2013.01); *G06F 3/064* (2013.01); *G06F 3/0605* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,453,383 | B1* | 9/2002 | Stoddard | G06F 3/0607 707/999.202 |
| 7,340,495 | B2* | 3/2008 | Buxton | G06F 9/3001 708/209 |
| 7,930,473 | B2* | 4/2011 | Rajan | G06F 3/0605 709/213 |
| 8,171,201 | B1* | 5/2012 | Edwards, Sr. | G06F 9/45558 711/112 |
| 8,195,890 | B1* | 6/2012 | James | G06F 12/0824 711/118 |
| 8,285,965 | B2* | 10/2012 | Karr | G06F 3/0605 711/173 |
| 8,484,433 | B2* | 7/2013 | Faith | G06F 3/0613 711/112 |
| 8,966,209 | B2* | 2/2015 | Post | G06F 3/0608 711/170 |
| 2004/0098556 | A1* | 5/2004 | Buxton | G06F 9/3001 711/201 |
| 2011/0125977 | A1* | 5/2011 | Karr | G06F 3/0605 711/162 |
| 2011/0166850 | A1* | 7/2011 | Achtermann | G06K 9/6224 704/9 |
| 2012/0131286 | A1* | 5/2012 | Faith | G06F 3/0613 711/154 |

(Continued)

*Primary Examiner* — Christopher D Birkhimer
(74) *Attorney, Agent, or Firm* — Klein, O'Neill & Singh, LLP

(57) ABSTRACT

Various embodiments are generally directed to an apparatus and method for creating a target data structure on a target storage system, the target data structure including a prefix region, a data region and a suffix region for storing information from a source data structure. Further, embodiments are directed to setting a size of the prefix region to align a partition of the source data structure with a block size boundary of the target data structure.

27 Claims, 10 Drawing Sheets

(56) References Cited

U.S. PATENT DOCUMENTS

2012/0185427 A1\* 7/2012 Fontignie ............ G06F 11/1435
707/609
2012/0197892 A1\* 8/2012 Achtermann ....... G06F 17/3071
707/737

\* cited by examiner

600

CREATE A TARGET DATA STRUCTURE ON A STORAGE SYSTEM, THE DATA STRUCTURE COMPRISING A PREFIX REGION, A DATA REGION AND A SUFFIX REGION FOR STORING INFORMATION FROM A SOURCE DATA STRUCTURE
*605*

SET A SIZE OF THE PREFIX REGION TO ALIGN A PARTITION FOR THE SOURCE DATA STRUCTURE WITH A BLOCK SIZE BOUNDARY OF THE TARGET DATA STRUCTURE
*610*

*FIG. 6*

TECHNIQUES FOR DYNAMICALLY ALIGNING A PARTITION WITH A BLOCK SIZE BOUNDARY

The present application claims the benefit of earlier filed Provisional U.S. Pat. App. No. 61/916,098, filed on Dec. 13, 2013, which is incorporated by reference herein in its entirety.

BACKGROUND

Storage systems may store and provide information to one or more guest computing systems in a network, such as a storage area network (SAN). More specifically, a guest computing system may write information to a storage system and read information from the storage system over one or more network connections.

These storage systems may include storage devices, such as disks, in an array to store the information. The disks may use geometry to identify themselves and their characteristics to an operating system of the storage system. Further, the operating system may create one or more partitions on the disks and the information may be stored in logical blocks defined by the operating system.

In some instances, the partition schemes on the guest computing system and the storage system may be different and the storage system's logical blocks for storing information may not align with the guest system's logical blocks for storing information. If the guest file system is not aligned with the storage file system, it might become necessary to read or write twice as many blocks of information than the guest computing system actually requested because any guest system data block actually occupies at least two partial storage system blocks.

BRIEF DESCRIPTION OF THE DRAWINGS

FIG. 6 illustrates an exemplary embodiment of a logic flow.

DETAILED DESCRIPTION

Figure 1A:
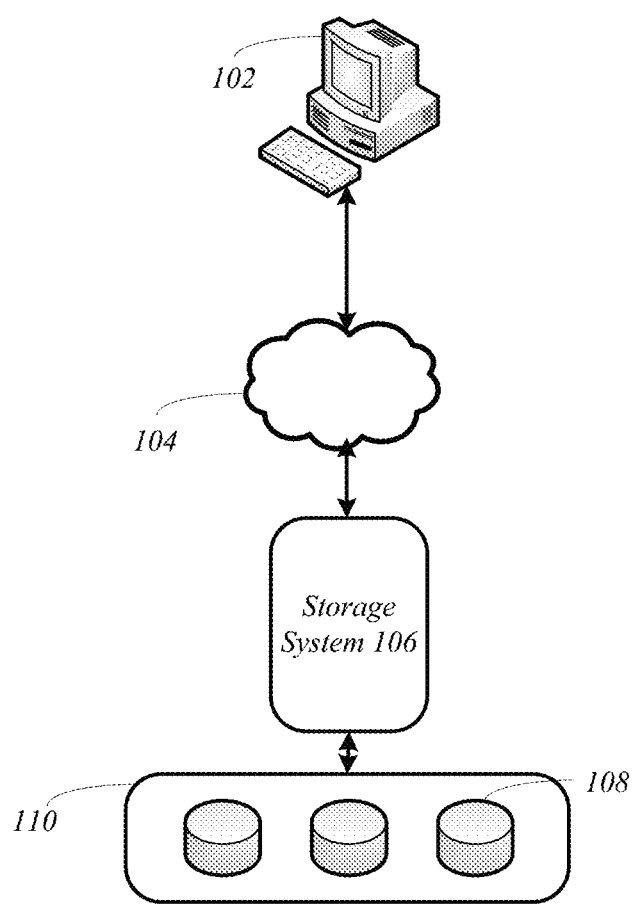
FIG. 1A illustrates an exemplary embodiment of a system overview of a computing system.

A SAN environment may include a guest or host computing system accessing and storing information on a storage system via one or more network connections. The information may be stored in a data structure, such as a logical unit identified by a logical unit number (LUN) on the storage system. In some instances, an additional storage system may be added to the SAN environment. For example, a user or administrator of the system may want to increase the storage capacity, upgrade the current storage system to a new storage system, replace the current storage system because of faulty hardware and so forth.

When an additional storage system is added to the SAN environment, the user or administrator may want to import information from the current storage system (source storage system) to the new storage system (target storage system). However, as previously discussed, significant performance penalties may occur when the file system of the target storage system is not aligned with the file system of the source storage system. Thus, various embodiments are directed to creating a data structure on the target storage system such that alignment occurs between the file systems.

For example, the target storage system may create a target data structure such as a logical unit having a prefix region, a data region, and a suffix region, for storing information from the source storage system. In various embodiments, the target storage system may determine the file system of the source storage system including the partition scheme for the source data structure. The target storage system may then create the target data structure such that the logical blocks of the source data structure align with the logical block boundaries of the target data structure.

In various embodiments, the target storage system may adjust the size of the prefix region of the target data structure such that the logical block boundaries of the source data structure align with the logical block boundaries of the data region of the target data structure. As will become apparent in the following description, the size of the prefix region may be calculated based on the starting logical block address for the first logical block of the source data structure to create alignment. These and other details are further described below with reference to the Figures.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is described here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus.

Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of an exemplary computing system 100 including a host device 102, network 104 having one or more interconnects, a storage system 106 and a storage array 110 having one or more storage devices 108. In various embodiments, computing system 100 may be a clustered storage system in a storage area network (SAN) environment. For simplicity purposes, FIG. 1 only illustrates one host device 102, and one storage system 106, however, computing system 100 may have any number of hosts devices 102 and storage system 106 to create or form a SAN environment.

Host device 102 may be may be a general-purpose computer configured to execute one or more applications. Moreover, the host device 102 may interact with the storage system 106 in accordance with a client/server model of information delivery. That is, the host device 102 may request the services of the storage system, and the system may return the results of the services requested by the host, by exchanging packets over the network 104. The host device 102 may issue packets including file-based access protocols, such as the Common Internet File System (CIFS) protocol or Network File System (NFS) protocol, over Transmission Control Protocol/Internet Protocol (TCP/IP) when accessing information in the form of files and directories. In addition, the host device 102 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

In various embodiments, network 104 may include a point-to-point connection or a shared medium, such as a local area network. In some embodiments, network 104 may include any number of devices and interconnect such that host 102 may communicate with storage system 106. Illustratively, the computer network 104 may be embodied as an Ethernet network or a Fibre Channel (FC) network. The host 102 may communicate with the storage system 106 over the network 104 by exchanging discrete frames or packets of data according to pre-defined protocols, such as TCP/IP, as previously discussed.

Storage system 106 may be one or more computers that provide storage services relating to the organization of information on storage devices, such as storage devices 108. As will be discussed in more detail below, storage system 106 may include a number of elements and components to provide storage services to host 102. More specifically, storage system 106 may include a number of elements, components, and modules to implement a high-level module, such as a file system, to logically organize the information as a hierarchical structure of directories, files and special types of files called virtual disks (vdisks), or logical unit identified by a logic unit number (LUN) on the storages devices 108.

In some embodiments, storages devices 108 may include hard disk drives (HDD) and direct access storage devices (DASD). In the same or alternative embodiments, the storage devices (writeable storage device media) 108 may comprise electronic media, e.g., flash memory, etc. As such, the illustrative description of writeable storage device media comprising magnetic media should be taken as exemplary only.

Storage of information on storage array 110 may be implemented as one or more storage "volumes" that comprise a collection of storage devices 108 cooperating to define an overall logical arrangement of volume block number (vbn) space on the volume(s). The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In some embodiments, the information on storage array 110 may be exported or sent to host 102 as one or more data structures such as a logical unit identified by logical unit numbers (LUNs). The LUN may be unique identifier used to designate individual or collections of hard disk devices for address by a protocol associated with a SCSI, iSCSI, Fibre Channel (FC), and so forth. Logical units are central to the management of block storage arrays shared over a storage area network (SAN). Each LUN identifies a specific logical unit, which may be a part of a hard disk drive, an entire hard disk or several hard disks in a storage device, for example. As such, a LUN could reference an entire RAID set, a single disk or partition, or multiple hard disks or partitions. The logical unit is treated as if it is a single device and is identified by the LUN.

Figure 1B:
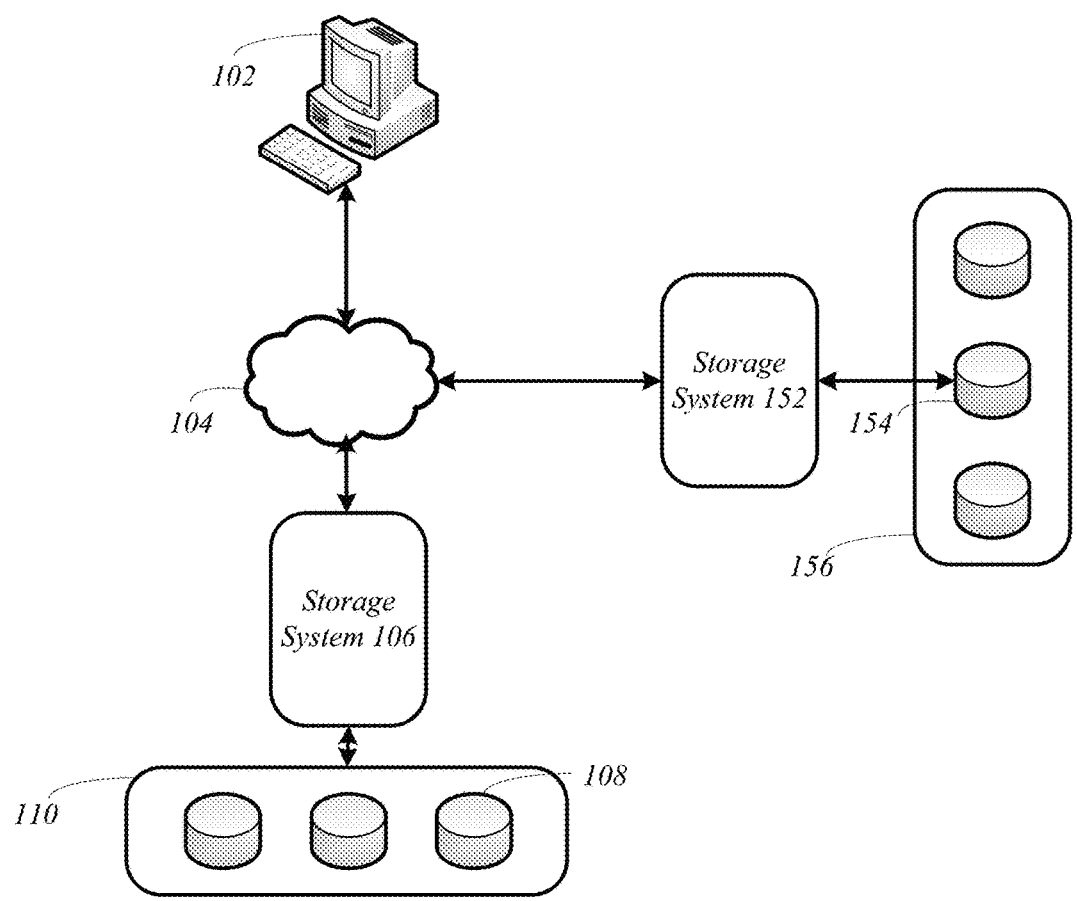
FIG. 1B illustrates a second exemplary embodiment of a system overview of a computing system.

FIG. 1B illustrates a second illustrative embodiment of a computing system 150 having an additional storage system 152 and storage array 156 having one or more storage devices 154. In various embodiments, storage system 152 may communicate with host 102 and storage system 106 via network 104 over one or more interconnects, as previously discussed above. In some embodiments, storage system 152 may be the same as or similar to storage system 106 and storage array 156 having storage devices 154 may be the same as or similar as storage array 110 and storage devices 108.

In various embodiments, storage system 152 and storage array 156 may be introduced into the SAN environment and information from storage system 106 and storage array 108 may be imported to storage system 152 and storage array 156. As will become more apparent with the following description, information stored in storage array 110 may be seamlessly copied or moved to storage array 156. Moreover, the copying or moving of the information may be transparent to the host device 102. In addition, once the information is imported from storage system 108 and storage array 110 to storage system 152 and storage array 156, storage system 108, and storage array 110 may be transparently removed from the computing system without the host devices 102 knowledge.

Figure 2:
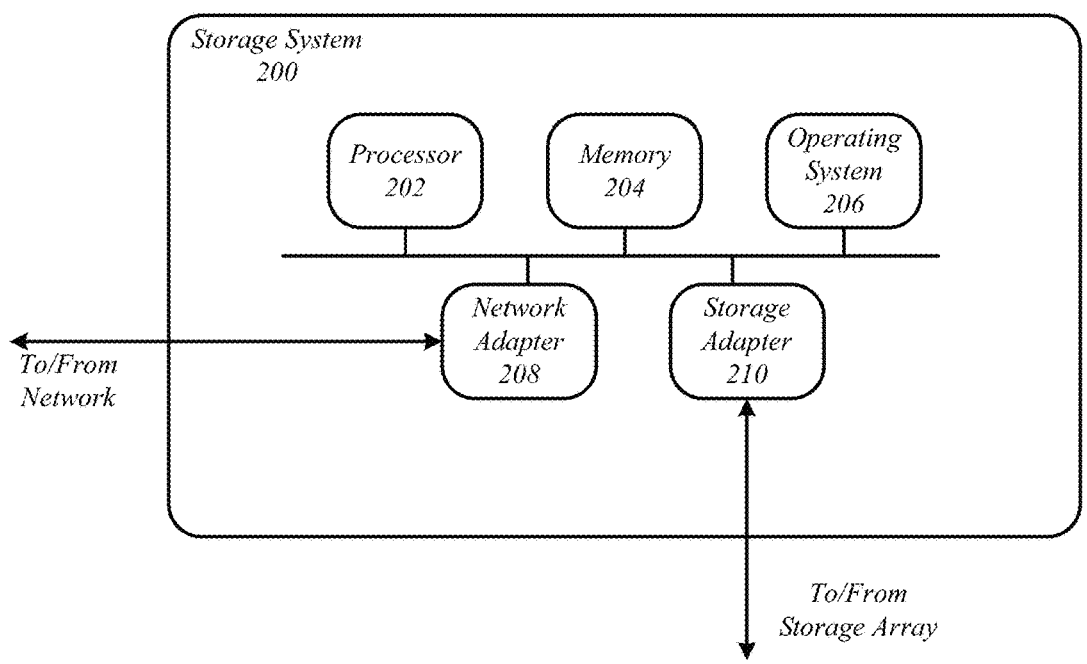
FIG. 2 illustrates an exemplary embodiment of hardware architecture of a storage system.

FIG. 2 illustrates an exemplary embodiment of hardware architecture of a storage system 200. In some embodiments, storage systems 106 and 152 may be the same or similar to storage system 200 and include the same or similar elements, modules, and components. Storage system 200 may include processor 202, memory 204, storage operating system 206, network adapter 208, and storage adapter 210. In various embodiments, the components of storage system 200 may communicate with each other via one or more interconnects, such as one or more traces, buses, and/or control lines.

Processor 202 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, storage system 200 may include more than one processor.

In one embodiment, storage system 200 may include a memory unit 204 to couple to processor 202. Memory unit 204 may be coupled to processor 202 via an interconnect, or by a dedicated communications bus between processor 202 and memory unit 204, as desired for a given implementation. Memory unit 204 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory unit 204 can store data momentarily, temporarily, or permanently. The memory unit 204 stores instructions and data for storage system 200. The memory unit 204 may also store temporary variables or other intermediate information while the processor 202 is executing instructions. The memory unit 204 is not limited to storing the above discussed data; the memory unit 204 may store any type of data. In various embodiments, memory 204 may store or include storage storage operating system 206

In various embodiments, storage system 200 may include storage operating system 206 to control storage operations on the storage system 200. In some embodiments, storage operating system 206 may be stored in memory 204 or any other type of storage device, unit, medium, and so forth. As will become more apparent with respect to FIG. 3, the storage operating system 206 may implement a write-anywhere file system that cooperates with virtualization modules to "virtualize" the storage space provided on the storage arrays and storage devices. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 208 may include the mechanical, electrical and signaling circuitry needed to connect the storage system 200 to one or more hosts and other storage systems over a network, which may comprise a point-to-point connection or a shared medium, such as a local area network.

In various embodiments, the storage adapter 210 cooperates with the storage operating system 206 executing on the storage system 200 to access information requested by a host device, guest device, another storage system, and so forth.

The information may be stored on any type of attached array of writable storage device media such as video tape, optical, DVD, magnetic tape, bubble memory, electronic random access memory, micro-electro mechanical, and any other similar media adapted to store information, including data and parity information. Further, the storage adapter 210 includes input/output (I/O) interface circuitry that couples to the disks over an I/O interconnect arrangement, such as a conventional high-performance, FC serial link topology.

Figure 3:
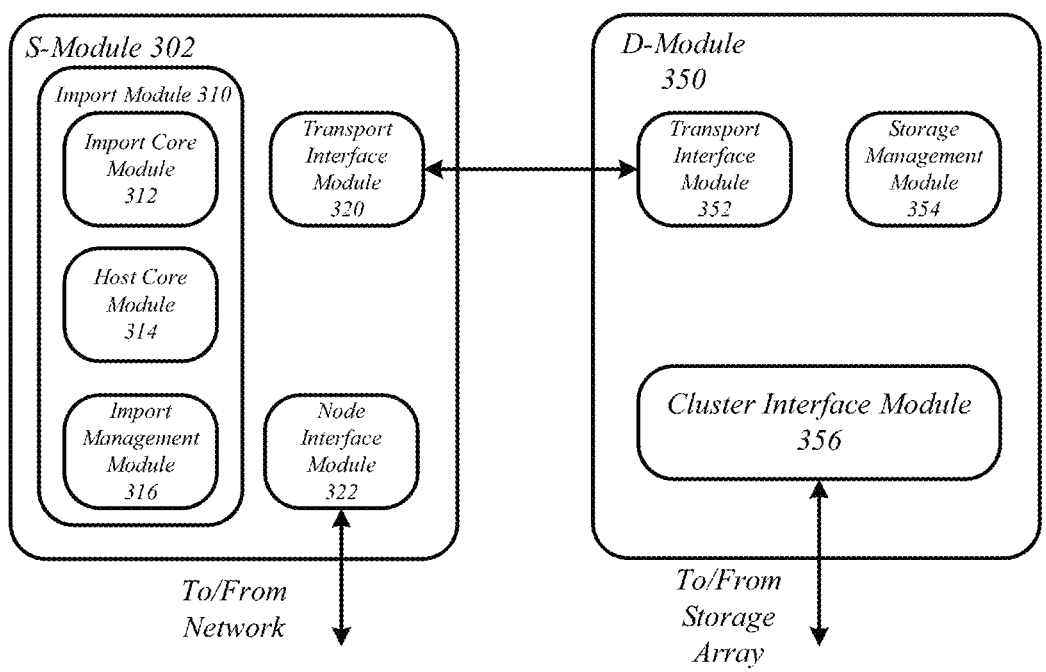
FIG. 3 illustrates an exemplary embodiment of a storage operating system architecture.

FIG. 3 illustrates an example of a storage operating system which can be used to implement an attached clustered storage system such as the storage systems and operating system shown in FIGS. 1 and 2. In the illustrated embodiment the storage operating system implements a storage system as a SCSI module (S-module 302), and a data module (D-module 350). The S-module 302 and D-module 350 may be implemented on the same or separate storage devices (e.g., storage controllers) or computing devices. The S-module 302 and D-module 350 include multiple functional components that provide a data path for a host to access information stored on the node using block access protocols, such as iSCSI, FCP, or FCoE. In addition, the S-module 302 and D-module include functional component or modules to import information from a source storage device such as a source storage system. The functional components in combination with underlying processing hardware form the S-module 302. While described as function components of the S-module herein, the functional components can be logically located essentially any place in the storage operating system.

The functional components in the S-module 302 include an import module 310, a transport interface module 320, and a node interface module 322. In various embodiments, the import module 310 may include an import core module 312, a host core module 314, and an import management module 316.

The node interface module 322 may include one or more functional components to provide various communication capabilities to interface with a host device or a source storage system. For example, the node interface module 322 may include components to enable communication over one or more of an Ethernet network or a Fibre Channel (FC) network. In addition, the node interface module 322 may enable exchanging blocks, or discrete frames or packets of data according various communication protocols. In some embodiments, the node interface module 322 may include one or more protocols to manage and enable communication over the FCP, iSCSI, or FCoE connections to/from the host and/or another storage system.

In some embodiments, the transport interface module 320 may include one or more communication components to enable communication of commands and data among the modules of storage system, such as to and from the D-module 350. More specifically, the transport interface module 320 may enable communication of information or data with the D-module 350, such as functional calls, information, or data blocks, or other types of communication messages.

In various embodiments, the import module 310 may enable and control different aspect of the storage system before and during the importation of information from a source storage system to a target storage system. The source storage system may be the storage system having information for importation and the target storage system may be the storage system to receive the information from the source storage system. For example, the import module 310 may include an import core module 312 to provide an interface and control operations during importation of information from the source to the target. More specifically, the import core module 312 will control the copying of information from the source to the target on a block-by-block basis. In addition, the import core module 312 includes controls to pause, resume and abort the import operations.

The import module 310 may also include a host core module 314 to handle input/output requests from a host device or guest device while information is being imported from a source storage system. More specifically, the host core module 314 handles the read, write and abort requests when the source storage system and target system are bound for importation of information.

For example, the host core module 314 will route a request and information to the appropriate storage system to enable a read, write, or abort request from host device or guest device. A read request is always serviced by the source storage system until the import is completed. The information received with a write request is written to both the target storage system and the source storage system.

In embodiments, the import module 310 may also include an import management module 316 to manage configuration and initiation of the import process from the source storage system to the target storage system. For example, the import management module 316 may determine the size of the source data structure storing the information for copying to the target storage system. The import management module 316 may also determine the partition scheme of the source storage system having the source data structure and which partition(s) store the information for copying to the target storage system. In some embodiments, the import management module 316 may also determine the operating system on the source storage system.

In various embodiments, the import management module 316 may communicate one or more messages over a network, such as network 104, to the source storage system to determine the size of the source data structure storing the information for copying to the target storage system. The import management module 316 may receive, in response to the communication, one or more messages indicating the size of the source data structure. The size may be indicated in a number of bits, bytes, kilobytes, megabytes, and so forth.

In some embodiments, the source data structure may be a logical unit identified by a logical unit number (LUN) used to designate individual or collections of hard disk devices for address by a protocol associated with a SCSI, iSCSI, Fibre Channel (FC), and so forth. In some embodiments, each LUN identifies a specific logical unit, which may be a part of a hard disk drive, an entire hard disk or several hard disks in a storage device, for example. As such, a LUN may reference an entire RAID set, a single disk or partition, or multiple hard disks or partitions. The logical unit is treated as if it is a single device and is identified by the LUN. In various embodiments, the information to copy from the source storage system to the target storage system may be stored in one or more logical units and identified by a single LUN or more than one LUN. The import management module 322 may receive information from the source storage system indicating the size of the one or more logical units having the information.

In some embodiments, the import management module 316 may determine the partition scheme for the data structure or logical unit storing the information on the source storage system. In various embodiments, the import management module 316 may communicate one or more messages or calls with the source storage system to determine the partition scheme of the one or more storage devices storing the information.

For example, the import management module 316 may communicate a read instruction to the source storage system to read a logical block address to determine a partition scheme for the logical unit. In some embodiments, the import management module 316 may communicate a message to the source storage system to read the contents of logical block address zero having disk label information or partition label information to determine the partition scheme for the source logical unit on the source storage system. However, various embodiments are not limited in this manner and the import management module 316 may communicate a message to read the disk label or partition label information from any logical block or sector of the logical unit or disk(s).

The import management module 316 may receive information from the source storage system indicating the partition scheme. For example, the import management module 316 may receive information from the source storage system indicating that the data structure or logical unit uses a Sun Microsystem Inc.® (SMI) partition scheme, a Master Boot Record (MBR) scheme, a globally unique identifiers (GUID) Partition Table (GPT) scheme, plain MBR scheme, extended MBR scheme and so forth. In some embodiments, the partition scheme may not be able to be determined and the import management module 316 may receive information indicating that the partition scheme is unknown, un-partitioned, or no layout was found.

In various embodiments, the import management module 316 may also determine the partition of the logical unit on the source storage system to align with a block size boundary or write anywhere file-system layout (WAFL) boundary of a logical unit on the target storage. The determination may be based on the partition scheme information received from the source storage system. For example, the import management module 316 may receive information indicating the partition scheme is a SMI partition scheme and determine to use slice 1 of the partition scheme to align with the block size or WAFL boundary. In another example, the partition scheme may be a GPT partition scheme and the import management module 316 may determine to use the largest partition of type "Data" to align with the block size or WAFL boundary. In a third example, the partition scheme may be a plain MBR partition scheme and the first or largest primary partition may be used to align with the block size or WAFL boundary. In another example, the partition scheme may be an extended MBR partition scheme and the largest extended partition may be used for alignment.

In some embodiments, the import management module 316 may receive or read information from the source storage system to determine the starting logical block address for the partition determined to be used for alignment. As will be discussed in more detail below, the starting logical block address may then be sent to a storage management module 354 of D-module 350 to determine a prefix region size of a logical unit and offset.

As previously discussed, the storage operating system may include a D-module 350 to manage, control and communicate with one or more storage arrays. In various embodiments, the D-module 350 may include a transport interface module 352, a storage management module 354, and a cluster interface module 356. While these modules are shown as components of the D-module 350 in this description, they can be located logically at essentially any place in the operating system.

In various embodiments, the transport interface module 352 may be the same as or similar to transport interface module 320. More specifically, the transport interface module 320 includes one or more communication components to enable communication of commands and data among the modules of storage system, such as to and from the S-module 302. More specifically, the transport interface module 352 may enable communication of information or data with the S-module 302, such as functional calls, information or data blocks, or other types of communication and information messages.

The D-module 350 may also include a storage management module 354 to manage and control one or more data structures, such as a logical unit identified by a LUN on one or more disk arrays. In various embodiments, the storage management module 354 may create a new or target data structure or logical unit having a prefix region, a data region and a suffix region. The target data structure may be used to import data from a source storage system, and in particular, a source data structure on the source storage system.

In various embodiments, the storage management module 354 may receive information from various modules of the S-module 302, such as the import management module 316, to create and configure the target data structure. More specifically, the storage management module 354 may receive information from the import management module 316 about the source data structure on the source storage system including the size of the source data structure, the operating system on the source storage system, the partition scheme of the source data structure, whether the partition scheme is known or unknown, and a starting logical address block for the partition including the information to copy to the target data structure.

The storage management module 354 may use this information to configure and create the target data structure such as a logical unit to store information from the source storage system and to be accessed by one or more host devices. In some embodiments, the storage management module 354 may create the target data structure the same size as the source data structure based on the information received from the import management module 316. However, in the same or other embodiments, the data region of the target data structure may be the same size as the source data structure. Furthermore, the storage management module 354 may determine whether an offset is needed, and if so, a size for the prefix region based on information received from the import management module 316.

In some embodiments, the storage management module 354 may first determine if the partition scheme is known or unknown or if any partitions exists on the source storage system. When the partition scheme is not known or if no partitions exist on the source storage system, the storage management module 354 may set the offset and the prefix region size to 0.

However, if the partition scheme is known, the storage management module 354 may determine if the partition having the information on the source node is already aligned with the block size or WAFL boundary. For example, the target data structure may have block sizes of 4 KB and thus a block size or WAFL boundary exists at every 4 KB and the storage management module 354 may determine if the partition is aligned on a boundary based on the starting logical block address information. In this example, if the starting logical block address is divisible by 4 then the partition is aligned with the boundary for a 4 KB block size. When the partition having the information on the source storage system is aligned with the block size or WAFL boundary no offset is needed and the storage management module 354 sets the prefix region size to 0.

However, if the storage management module 354 determines that the partition is not aligned with the block size or WAFL boundary an offset is required and the prefix region size must be determined. In various embodiments, the prefix region size may be determined by the following equation:

$$\text{prefixInBytes}=(\text{partition\_start\_address} \% \text{LBAsPerWaflBlock})*\text{lbasize},\qquad \text{Equation 1}$$

where:
the prefixInBytes is the size of the prefix region in bytes;
the partition_start_address is the starting logical block address for the partition on the source storage system having the information to import;
the LBAsPerWaflBlock is the number of logical block addresses per block for the new or target data structure; and
the lbasize is the logical block address size for the new or target data structure.

The storage management module 354 may use Equation 1 to determine the size of the prefix region in bytes. For example, the storage management module 354 may receive the starting logical block address for the partition on the source storage system of 63. The logical block addresses per block and logical block address size for the target data structure may be predefined or determined by the storage management module 354. In this example, the logical block addresses per block is 8 and the logical block address size is 512B, creating a 4 KB block. The prefix region size may be calculated to be 3584 bytes since (63% 8)*512=3584. This is just one example for calculating the prefix region size, the prefix region size may be set to any number of bytes based on the starting address of the partition on the source storage system and the new data structure.

In some embodiments, the storage management module 354 may set the prefix region size to a default size. For example, the starting logical block address may not be determined in some instances and the storage management module 354 may set the prefix region size to a default size based on the operating system on the source storage system. For example, if the operating system is the Windows® operating system, the prefix region size may be set to 32256 bytes, if the operating system is the Windows® operating system using a GPT partition scheme the prefix region size may be set to 17408 bytes. In some embodiments, the source storage system may utilize the Linux® operating system and the prefix region size may be set to 0 bytes. In another example, the source storage system may have the SUN Solaris® operating system and the prefix region size may be set 17408 bytes or based on the data structure size on the source storage system.

As previously discussed, storage management module 354 may create a new or target data structure such as a logical unit having the same size as the source data structure on the source storage system and may also configure the prefix region size. Once the new or target data structure is created on the target storage system, the information on the source storage system may be imported to the target storage system on a block-by-block basis or any other type of information communication means.

In some embodiments, the D-module 350 may also include a cluster interface module 356 to communicate with a storage array, one or more disks, one or more storage devices, and so forth. The cluster interface module 356 may manage the layout of information on storage array, disks, storage devices, etc. and serves read and write requests. The cluster interface module 356 may also manage the storage and retrieval of information to and from the storage array, disks, storage devices, etc. More specifically, the cluster interface module 356 may include storage access protocols such as Small Computer System Interface (SCSI) or FCP to communicate information to and from the storage array, disks, storage devices and so forth.

Figure 4A:
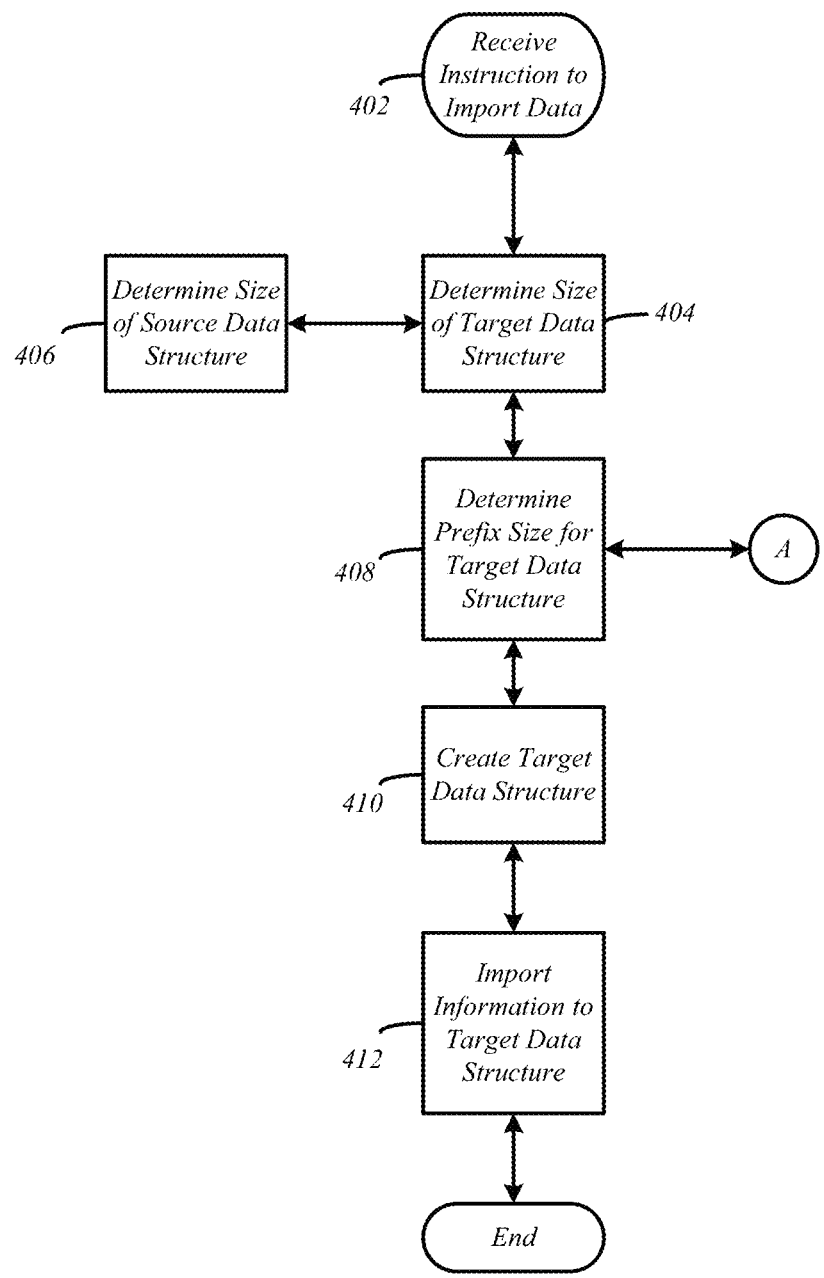
FIGS. 4A/4B illustrate exemplary embodiments of logic flow diagrams to configure and create a target data structure.

FIG. 4A/4B illustrate exemplary embodiments of logical flow diagrams 400 and 450 to initialize importation of information from a source storage system to a target storage system. In various embodiments, an importation of information may be initiated on a target storage system via one or more instructions received at the target storage system at block 402. For example, the target storage system may receive a user initiated instruction to start the importation of information from a source storage system to the target storage system. However, in some embodiments, the target cluster may initiate an importation of information from the source storage system automatically upon detection of the source storage system when the target storage system is added to a network.

In some embodiments, a data structure, such as a logical unit, may need to be created on the target storage system to receive information from the source storage system. In various embodiments, the data structure may include a prefix region, a data region, and a suffix region. At block 404 the size of the new or target data structure may be determined. More specifically, the size of the target data structure may be set such that it is the same size as the source data structure on the source storage system determined at block 406. In some embodiments, the size of the data region of the target data structure may be the same size as the source data structure.

In addition to determining the size of the target data structure, the prefix region size may also be determined for the target data structure at block 408. In various embodiments, the size of the prefix region may be determined and set such that the logical block boundaries of the logical blocks of the source data structure are aligned with the block size or WAFL boundaries of the target data structure.

Figure 4B:
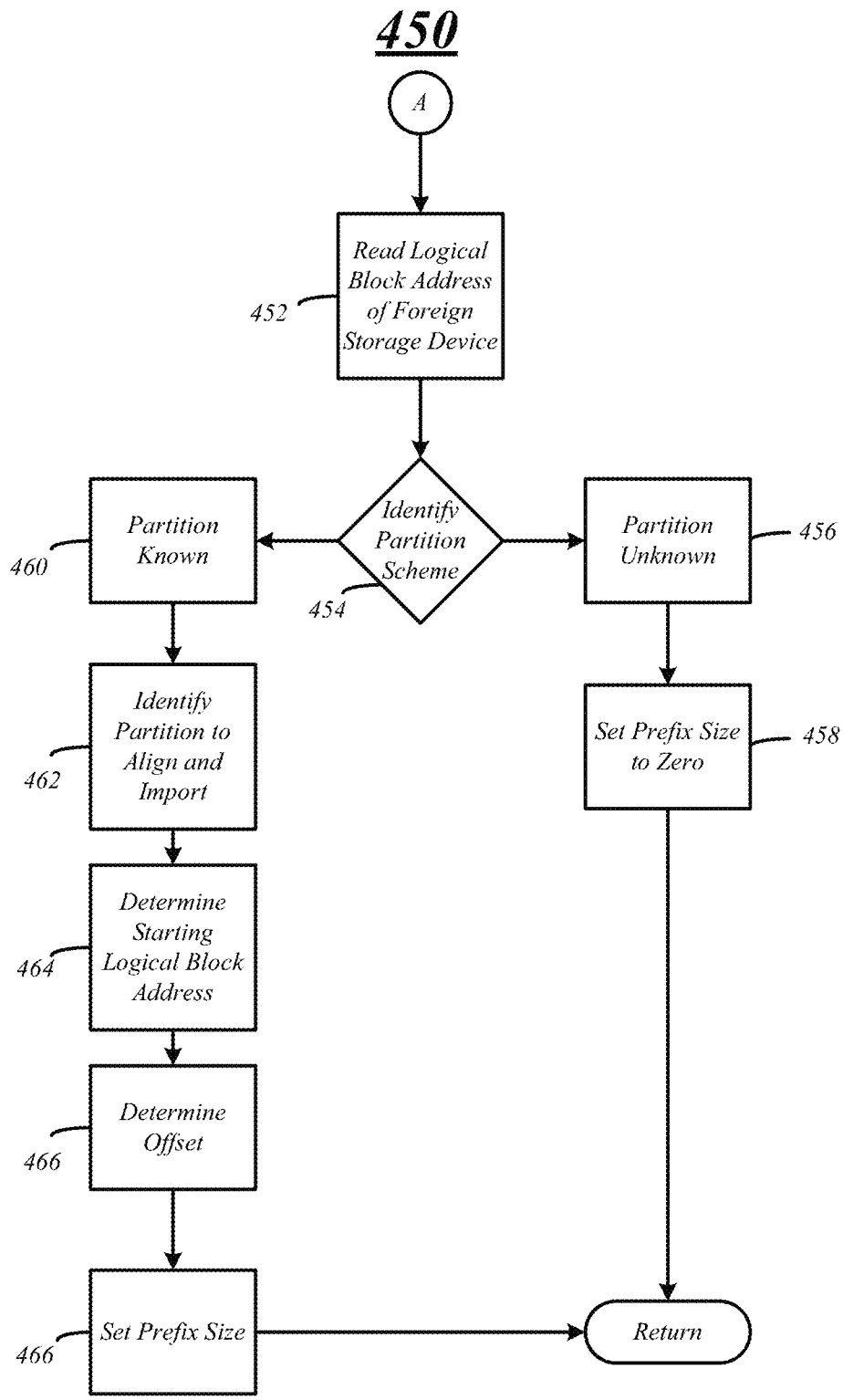

FIG. 4B and logical flow diagram 450 illustrate further detail to determine the size of the prefix region for the target data structure. For example, a logical block address on a source storage system may be read to determine the partition scheme of the source data structure at block 452. For example, the contents of logical block address 0 may include a partition table or disk label defining the partition scheme for the source data structure. At block 454 the partition scheme may or may not be identified based on the partition table or disk label.

In some embodiments, the partition scheme may not be identified, may be unknown, undefined, etc. at block 456. If the partition scheme is determined to be unknown, undefined, etc., the size of the prefix region may be determined and set to zero at block 458. Logic flow 450 may then return back to block 408 of logic flow 400.

At block 460, the partition scheme for the source data structure may be known and the size of the prefix region of the target data structure may be set based of the known partition scheme. More specifically, the partition having the information for importation may be identified at block 462 based on the partition scheme identified at blocks 454 and 460. For example, the partition scheme may be a SMI partition scheme and slice 1 of the partition scheme may be used to align with the block size or WAFL boundary. In another example, the partition scheme may be a GPT partition scheme and the largest partition of type "Data" may be used to align with the block size or WAFL boundary. In a third example, the partition scheme may be a plain MBR partition scheme and the first or largest primary partition may be used to align with the block size or WAFL boundary. In another example, the partition scheme may be an extended MBR partition scheme and the largest extended partition may be used for alignment. Various embodiments are not limited to the above-recited examples and other partition schemes and partitions to align may be identified.

Once the partition for the source data structure is identified, the starting logical block address for the partition may be determined at block 464. The starting logical block address is the logical block address where the partition including the information for importation starts or begins. In various embodiments, the starting block address may be included in the partition table or disk label read at block 452.

At block 466 of logic flow 450 the offset and the size of the prefix region may be determined. In some embodiments, equation 1 may be used to determine the size of the prefix such that block boundaries of the source data structure is aligned with the block boundaries of the target data structure and the prefix region size may be set at block 468. Logic flow 450 may then return to block 408 of logic flow 400.

Once the prefix region size is determined at block 408, the new or target data structure may be created at block 410. The size of the prefix region may be set or configured based on the determination made at block 408 and logic flow 450. Information may be imported from the source storage system and source data structure to the target storage system and target data structure at block 412. The information may be imported on a block-by-block basis from the source storage system to the target storage system and written into the target data structure.

Figure 5A:
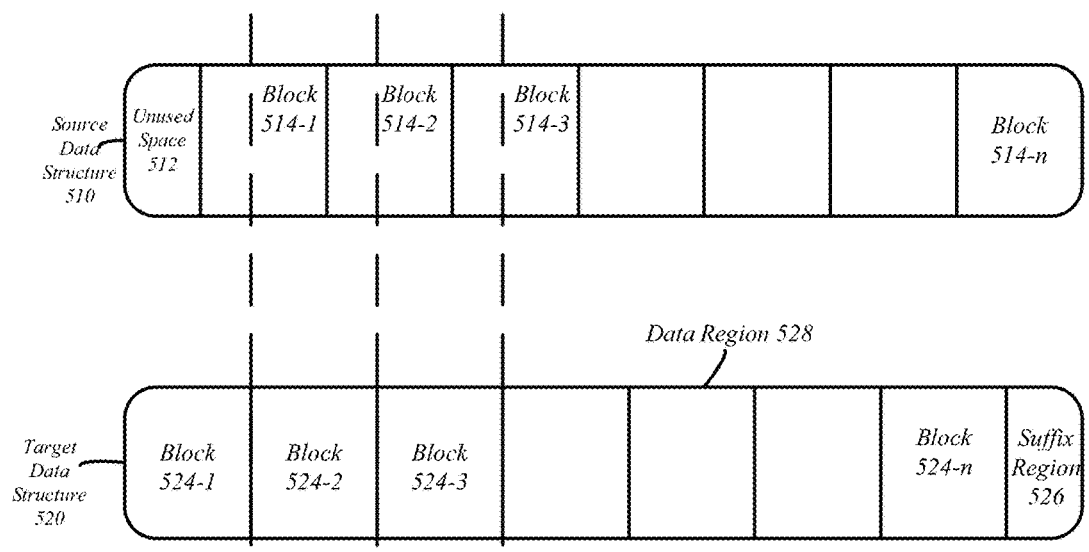
FIGS. 5A/5B illustrate exemplary embodiments of source and target data structures.

FIG. 5A illustrates an exemplary embodiment of misaligned data structures for importation of information. More specifically, FIG. 5A illustrate a source data structure 510 and a target data structure 520 where the logical data blocks of the source data structure 510 are not aligned with the logical data blocks of the target data structure 520. In FIG. 5A, the source data structure includes an unused space 512 and logical data blocks 514-1 through 514-n. In various embodiments, the source data structure 510 may be any type of data structure such as a logical unit and may include any number of logical data blocks of information. In addition, the unused space 512 may be unused in the sense that it does not include information for importation to the target data structure 520, but may include other information. For example, the unused space 512 may include configuration information or another type of information.

In FIG. 5A, the target data structure includes a data region 528 having logical data blocks 524-1 through 524-n and a suffix region 526. In various embodiments, the target data structure 520 may be any type of data structure including a logical unit. As illustrated in FIG. 5A, the logical data blocks 514 of the source data structure are not aligned with the logical data blocks 524 boundaries. In this exemplary embodiment, the misalignment is caused by the partition scheme for the source data structure including the unused space 512 creating an offset. Thus, the logical data blocks 514 of the source data structure 510 occupy two logical data blocks 524 of the target data structure 520. For example, FIG. 5A illustrates logical data block 514-1 occupying logical data blocks 524-1 and 524-2 of the target data structure 520. Thus, as previous discussed, the partition scheme of the source data structure may be determined and a size of a prefix region of the target data structure 520 may be set such that the logical data blocks 514 of the source data structure 510 are aligned with the logical data blocks 524 of the target 524.

Figure 5B:
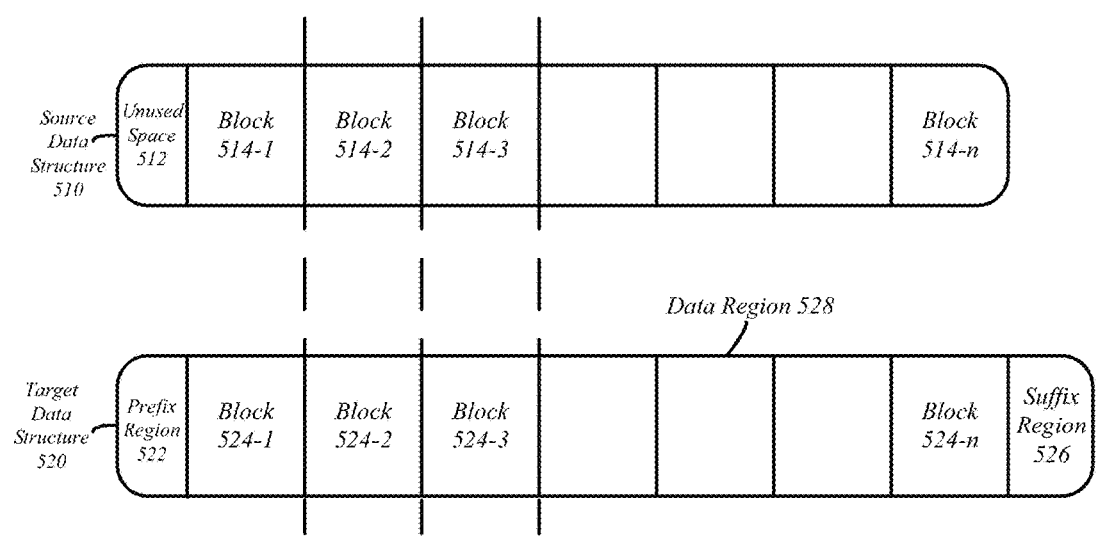

FIG. 5B illustrates an exemplary embodiment of data structures aligned for importation of information. In FIG. 5B, the source data structure 510 is the as the source data structure in FIG. 5A. However, the target data structure 520 includes a prefix region 522. The size of the prefix region 522 may be determined based on the starting logical block address of the first data block 514-1 of the source data structure 510 having information for importation. More specifically, the starting logical block address may be used with equation 1 to determine the size of the prefix region 522 such that the block boundaries of the source data structure are now aligned with the block boundaries of the target data structure, as illustrated in FIG. 5B. Therefore, the Input/Output read and writes are optimized for the target data structure 520 increasing performance of the target storage system.

FIG. 6 illustrates an embodiment of logic flow 600. The logic flow 600 may be representative of some or all of the operations executed by one or more embodiments described herein. For example, the logic flow 600 may illustrate operations performed by the systems 100 and 200.

In the illustrated embodiment shown in FIG. 6, the logic flow 600 may include creating a target data structure on a storage system, the data structure comprising a prefix region, a data region and a suffix region for storing information from a source data structure. More specifically, one or more components of a target storage system may create a target data structure, such as a logical unit to store information from a source storage system having a source data structure. In some embodiments, the data structure may be created such that the data region is the same size as the source data structure.

In some embodiments, the source and target data structures may also be defined as a number of logical data blocks and the logical blocks of the source data structure may align with the blocks of the target data structure such that reads and writes between the data structures are optimized. However, in other embodiments, the logical data blocks of the source data structure may not align with the logical data blocks of the target data structure creating inefficiencies while reading and writing between the data structures. Thus, logic flow 600 may also include setting a size of the prefix region to align a partition for the source data structure with a block size boundary of the target data structure at block 610.

In particular, the target storage system may determine a partition for the source data structure including the information to import to the target data structure. In some embodiments, the target storage system may determine a partition scheme for the source data structure and a partition including the information for the source data structure on the source storage system. The target storage system may also determine the starting logical block address for the logical data block having the information in the source data structure to determine if an offset and the size of the prefix region of the target data structure needs to be adjusted or set. For example, when the starting block address is not evenly divisible by the block size of the logical data blocks of the target data structure, misalignment may occur between the source data structure's logical blocks and the target data structure's logical blocks. Thus, the target storage system may set a size of the prefix region for the target data structure to align the logical blocks of both data structures for optimized data transfer. The size of the prefix region may be determined based on equation 1, as previously discussed. Once, the target data structure is created with the appropriate prefix region, information may be imported from the source storage system to the target storage system in an optimized manner.

Figure 7:
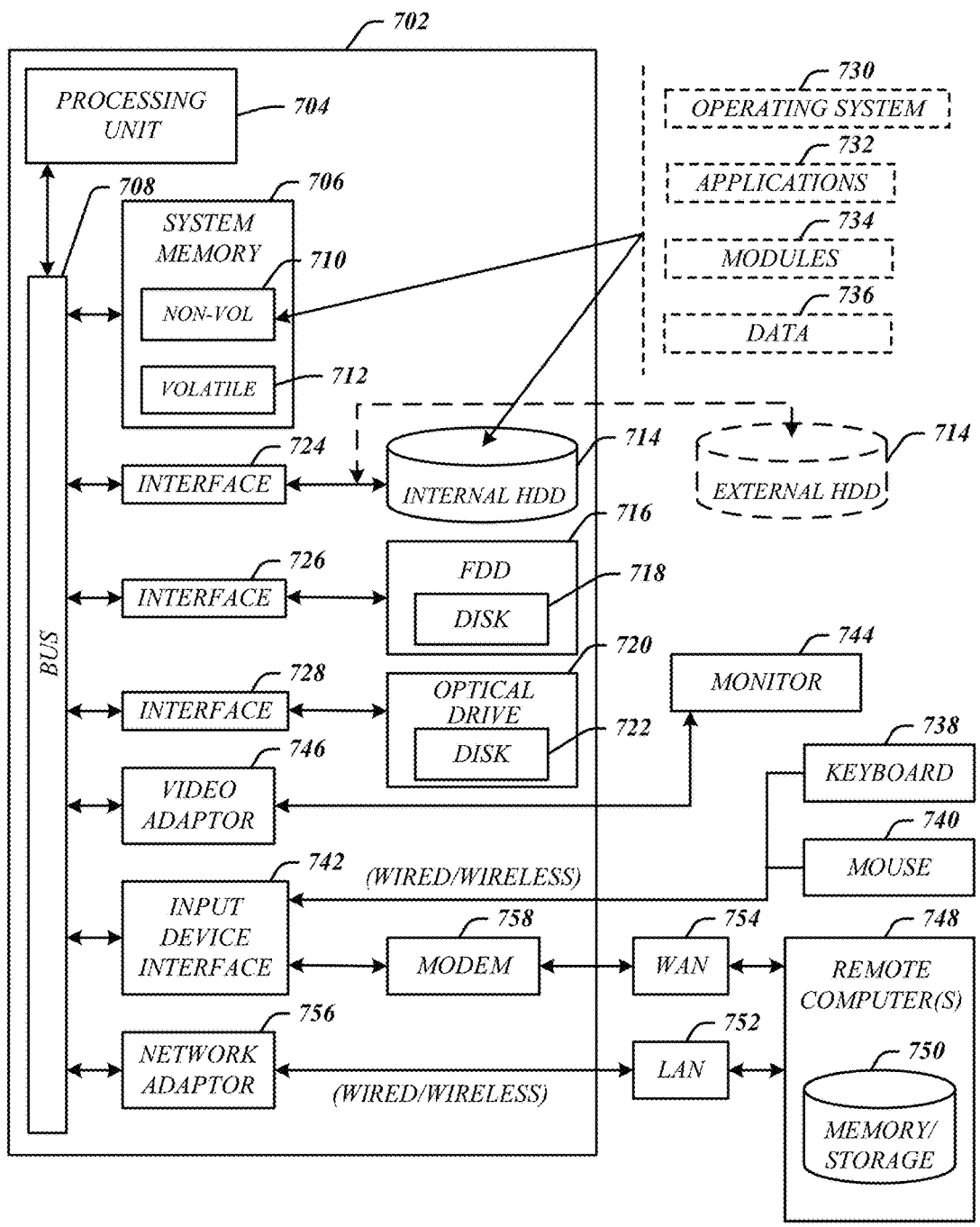
FIG. 7 illustrates an embodiment of a first computing architecture.

FIG. 7 illustrates an embodiment of an exemplary computing architecture 700 suitable for implementing various embodiments as previously described. In one embodiment, the computing architecture 700 may comprise or be implemented as part of computing system, such as storage systems 106, 152 and 200.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the storage systems 106, 152, and 200 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a computer-readable storage medium comprising instructions that when executed enable a processor to:
   retrieve a partition scheme of a partition of a source data structure of a logical unit of a source storage system storing information for a client device;
   wherein the source data structure includes unused space, the partition scheme varies based on an operating system of the source storage system and the partition varies based on a size of the unused space;
   determine a size of a prefix region of a target data structure of a target storage system for importing information from the source data structure to a data region of the target data structure;
   wherein the size of the prefix region is based on:
      a starting logical block address size of the partition of the source data structure,
      a number of logical block addresses per block of the target data structure; and
      a logical block size of the target data structure;
   create the target data structure with the prefix region, the data region and a suffix region on the target storing system; and
   set the size of the prefix region to align the partition of the source data structure with a block size boundary of the target data structure.

2. The article of claim 1, comprising instructions that when executed enable the processor to determine the partition scheme for the partition by reading a disk label.

3. The article of claim 2, comprising instructions that when executed enable the processor to:
   determine the partition from a plurality of partitions to align with the block size boundary and the starting logical block address for the partition; and
   determine the size of the prefix region based on the starting logical block address.

4. The article of claim 2, comprising instructions that when executed enable the processor to set the size of the prefix region to a default value for a known partition scheme.

5. The article of claim 2, comprising instructions that when executed enable the processor to set the size of the prefix region to zero when the partition scheme is unknown.

6. The article of claim 2, comprising instructions that when executed enable the processor to determine the largest partition when more than one partition exists for the source data structure and to set the size of the prefix region to align the largest partition with the block size boundary of the target data structure.

7. The article of claim 2, comprising instructions that when executed enable the processor to set the size of the prefix region to zero when the partition is aligned with the block size boundary.

8. The article of claim 2, comprising instructions that when executed enable the processor to set the size of the prefix region to zero when the information is located in un-known space.

9. The article of claim 1, comprising instructions that when executed enable the processor to determine the partition scheme for the partition by reading a partition table.

10. A computer-implemented method, comprising:
retrieving a partition scheme of a partition of a source data structure of a logical unit of a source storage system storing information for a client device;
wherein the source data structure includes unused space, the partition scheme varies based on an operating system of the source storage system and the partition varies based on a size of the unused space;
determining a size of a prefix region of a target data structure of a target storage system for importing information from the source data structure to a data region of the target data structure;
wherein the size of the prefix region is based on:
a starting logical block address size of the partition of the source data structure,
a number of logical block addresses per block of the target data structure; and
a logical block size of the target data structure;
creating the target data structure with the prefix region, the data region and a suffix region on the target storage system; and
setting the size of the prefix region to align the partition of the source data structure with a block size boundary of the target data structure.

11. The method of claim 10, comprising:
determining the partition scheme for the partition by reading one of a disk label.

12. The method of claim 11, comprising:
determining the partition from a plurality of partitions to align with the block size boundary and the starting logical block address for the partition; and
determining the size of the prefix region based on the starting logical block address.

13. The method of claim 11, comprising:
setting the size of the prefix region to a default value for a known partition scheme.

14. The method of claim 11, comprising:
setting the size of the prefix region to zero when the partition scheme is unknown.

15. The method of claim 11, comprising:
determining the largest partition when more than one partition exists for the source data structure; and
setting the size of the prefix region to align the largest partition with the block size boundary of the target data structure.

16. The method of claim 11, comprising:
setting the size of the prefix region to zero when the partition is aligned with the block size boundary.

17. The method of claim 11, comprising:
setting the size of the prefix region to zero when the information is located in un-known space.

18. The method of claim 10, comprising:
determining the partition scheme for the partition by reading a partition table.

19. A system, comprising:
a memory containing machine readable medium comprising machine executable code having stored thereon instructions; and a processor coupled to the memory to execute the machine executable code to:
retrieve a partition scheme of a partition of a source data structure of a logical unit of a source storage system storing information for a client device;
wherein the source data structure includes unused space, the partition scheme varies based on an operating system of the source storage system and the partition varies based on a size of the unused space;
determine a size of a prefix region of a target data structure of a target storage system for importing information from the source data structure to a data region of the target data structure;
wherein the size of the prefix region is based on:
a starting logical block address size of the partition of the source data structure,
a number of logical block addresses per block of the target data structure; and
a logical block size of the target data structure;
create the target data structure with the prefix region, the data region and a suffix region on the target storage system; and
set the size of the prefix region to align the partition of the source data structure with a block size boundary of the target data structure.

20. The system of claim 19, the machine executable code further causes the processor to determine the partition scheme for the partition by reading a disk label.

21. The system of claim 20, the machine executable code further causes the processor to:
determine the partition from a plurality of partitions to align with the block size boundary and the starting logical block address for the partition; and
determine the size of the prefix region based on the starting logical block address.

22. The system of claim 20, the machine executable code further causes the processor to set the size of the prefix region to a default value for a known partition scheme.

23. The system of claim 20, the machine executable code further causes the processor to set the size of the prefix region to zero when the partition scheme is unknown.

24. The system of claim 20, the machine executable code further causes the processor to determine the largest partition when more than one partition exists for the source data structure and to set the size of the prefix region to align the largest partition with the block size boundary of the target data structure.

25. The system of claim 20, the machine executable code further causes the processor to set the size of the prefix region to zero when the partition is aligned with the block size boundary.

26. The system of claim 20, the machine executable code further causes the processor to set the size of the prefix region to zero when the information is located in un-known space.

27. The system of claim 19, the machine executable code further causes the processor to determine the partition scheme for the partition by reading a partition table.

* * * * *